May 5, 1931.  P. R. DIJKSTERHUIS  1,804,325
CONSTANT MAGNITUDE CONTROL SYSTEM
Filed Aug. 12, 1929
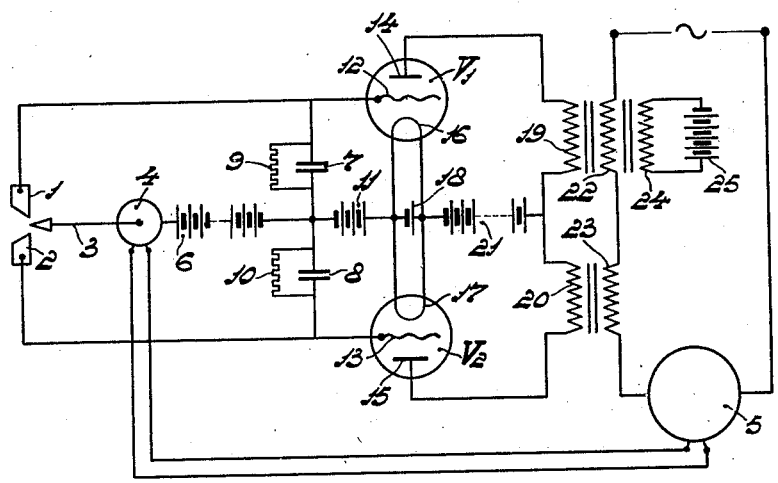
Inventor:
Popko R. Dijksterhuis,
by Langner, Parry, Card & Langner
Att'ys.

Patented May 5, 1931

1,804,325

UNITED STATES PATENT OFFICE

POPKO REINDER DIJKSTERHUIS, OF EINDHOVEN, NETHERLANDS, ASSIGNOR TO N. V. PHILIPS GLOEILAMPENFABRIEKEN, OF EINDHOVEN, NETHERLANDS, A LIMITED LIABILITY COMPANY, OF THE NETHERLANDS

CONSTANT MAGNITUDE CONTROL SYSTEM

Application filed August 13, 1929, Serial No. 385,429, and in the Netherlands October 24, 1928.

The invention is concerned with a device which allows of keeping within narrow limits a temperature, a voltage, a speed or a similar magnitude.

According to the invention, for this purpose a movable conductor whose momentary position depends on the momentary value of the magnitude to be regulated and which is connected with a source of voltage, is arranged between two stationary conductors which are arranged at some mutual distance from each other. These latter conductors are connected with the control grids of two thermionic tubes and with one of the electrodes of two condensers whose other electrodes are connected with the above mentioned source of voltage and with the cathodes of the said tubes, the anode circuits of these tubes acting in opposite senses on the value of the magnitude to be controlled.

Further features of the invention will appear from the following description in which a mode of realization of the invention is explained more fully with reference to the accompanying drawing.

In the drawing 1 and 2 denote stationary conductors between which is left a small space. In this narrow intervening space is movable the pointer 3 of a measuring instrument 4 which in the case under consideration is supposed to be a meter for indicating the temperature of an electric furnace 5, which temperature it is desired to keep as constant as possible.

The pointer 3 is electrically connected with one of the terminals of a source 6 of high voltage whose other terminal is connected with one of the electrodes of two condensers 7 and 8. These two condensers are bridged by leakage resistances 9 and 10 respectively.

With relation to the thickness of the pointer 3 and the voltage of the battery 6 the distance between the conductors 1 and 2 is so chosen that when the pointer 3 is in its middle-position, the production of a disruptive discharge will only just be avoided. When, however, the pointer 3 moves either towards the conductor 1 or towards the conductor 2, a disruptive discharge to the nearest conductor will be produced at once and, according to the circumstances, the condensers 7 and 8 will be charged. This charge gradually flows away via the resistance 9 or 10.

The connecting point of the condensers 7 and 8 is connected not only with one of the terminals of the battery 6 but also with the negative terminal of a biasing battery 11 which applies the required bias to the grids 12 and 13 of two triodes $V_1$ and $V_2$. The anodes 14 and 15 of these triodes are connected via the primary windings 19 and 20 respectively of two transformers with the positive terminal of an anode battery 21. The two triodes further comprise incandescent cathodes 16 and 17 respectively which are both supplied by a battery 18.

Now the arrangement is such that when the pointer 3 occupies its middle-position and the condensers 7 and 8 are discharged, the tubes $V_1$ and $V_2$ are traversed by a small practically negligible anode current. If, however, the pointer 3 is moved out of its middle-position, a disruptive discharge will be produced and one of the two grids 12 and 13 acquires a strongly positive charge so that either in the winding 19 or in the winding 20 direct-current excitation takes place.

The transformer provided with the winding 19, also comprises a second winding 22 which is included in the supply circuit of the electric furnace 5 which is heated by means of alternating current and in addition, a third winding 24 which is supplied by a battery 25 and which consequently may bring about a permanent magnetization of the transformer. This magnetization is contrary to that produced by the winding 19 when the latter is traversed by an anode current. The result thereof is that the inductive reactance of the winding 22 increases as soon as the winding 19 is excited.

The other transformer to which pertains the winding 20, comprises a secondary winding 23 which is also located in the supply circuit of the furnace 5 and in series with the winding 22. As long as no current passes through the winding 20, the average magnetic induction in the core of this transformer is almost equal to zero and the inductive reactance of the coil 23 has a maximum value. As soon as the winding 20 is excited, the inductive reactance on the coil 23 decreases.

From the foregoing it consequently follows that when the grid 12 becomes positive, the inductive reactance of the winding 22 increases while the inductive reactance of the winding 23 remains the same. The intensity of the current circulating in the supply circuit of the furnace 5 and therefore the temperature of the latter will consequently decrease. If consequently the arrangement is made such that when the temperature of the furnace increases the needle 3 moves towards the conductor 1 and vice versa, it is possible in the manner above described to keep the temperature of the furnace constant within narrow limits.

As will be obvious from the foregoing, the winding 22 normally has a low self-induction, while the winding 23 normally has a relatively high self-induction. If the temperature of the furnace becomes too great, the supply thereto must be decreased, and this result is accomplished by increasing the induction of the winding 23. If on the other hand, the temperature decreases, the supply current must be increased, and this result is accomplished by decreasing the inductance of the winding 23.

The winding 24 is mounted about the same core as the winding 22, and because of its self-inductance, employs a certain quantum of the magnetizing flux flowing through the core, so that the self-induction of the winding 22 is appreciably decreased because of lack of magnetizing flux. Now, if the current supply increases, raising the temperature in the furnace 5, contacts are completed through the tube $V_1$, whereby a circuit is completed through the winding 19 wound on the same core as the windings 22 and 24 but in opposite sense to the winding 24. Thus the magnetization effects of the two windings 19 and 24 on the same core have the tendency to neutralize each other, whereby the full magnetization flux of the core is available to produce self-induction in the winding 22, thereby decreasing the current flow.

On the other hand, should the temperature in the furnace 5 fall below a certain point, a circuit is completed through the valve $V_2$ and winding 20 whereby a portion of the magnetic flux in the core on which the winding 23 is wound is withdrawn to produce self-induction of the winding 20, whereby the effective self-induction of the winding 23 is diminished, and the current flow through the supply current is correspondingly increased.

Although the arrangement as above described is only used for keeping constant the temperature of a body heated by alternating current, it is obvious that many other, quite different applications are possible. In fact it is nearly always possible to bring about the displacements of a movable conductor such, for example as a pointer, by the action of the instantaneous value of a voltage, a current intensity, a speed or a similar magnitude. Owing to this it is possible to cause in the above described manner current to flow alternately and according to circumstances in the anode circuits of two triodes whilst, in addition, it will always be possible to cause these anode circuits to influence the magnitude to be controlled in such manner that they exert an opposite influence thereon.

What I claim is:—

1. A temperature regulator, comprising a movable conductor, stationary conductors between which the movable conductor is located, the instantaneous position of the said movable conductor being controlled by the temperature to be regulated, thermionic valves cooperating with the said stationary conductors, input circuits for the said valves, each of the stationary conductors forming a contact in the corresponding input circuit, a plate circuit for each of the said valves, an inductive winding in the plate circuit of each valve, a core for each of the said windings, a body to be heated, a supply circuit for the said body, and a further winding on each of the said cores, the said last-mentioned windings lying in the said supply circuit, means supplying a flux to one of the said cores in opposite sense to that supplied by the corresponding last mentioned winding.

2. A temperature regulator, comprising a movable conductor, stationary conductors between which the movable conductor is placed, the instantaneous position of the said movable conductor being controlled by the temperature to be regulated, the stationary conductors being arranged at some distance apart, two thermionic valves having control grids, cathodes and plates, two resistance-shunted condensers, one cooperating with each of the thermionic valves, the said stationary conductors each being connected to the control grid of the corresponding valve and to one of the electrodes of the corresponding condenser, a source of potential to which the said movable conductor is connected, the other electrodes of each of the condensers being connected to the other side of the said potential source and to the cathode of the said valves, a plate circuit for each of the valves, an inductive winding in the plate circuit of each of the valves, and carrying the plate current thereof, a separate core for each of the said windings, each winding being connected in the plate circuit of the corresponding valve and carrying the plate current, a supply circuit carrying the heating current, a winding in the said supply circuit on each of the said cores, each of the first-mentioned windings being adapted to vary the magnetization of the corresponding core in senses opposite to each other, and means supplying a flux to one of the said cores in opposite sense to that supplied by the corresponding last-mentioned winding.

3. A temperature regulator, comprising a movable conductor, stationary conductors between which the movable conductor is placed, the instantaneous position of the said movable conductor being controlled by the temperature to be regulated, the stationary conductors being arranged at some distance apart, two thermionic valves having control grids, cathodes and plates, two resistance-shunted condensers, one cooperating with each of the thermionic valves, the said stationary conductors each being connected to the control grid of the corresponding valve and to one of the electrodes of the corresponding condenser, a source of potential to which the said movable conductor is connected, the other electrodes of each of the condensers being connected to the other side of the said potential source and to the cathodes of the said valves, a plate circuit for each of the valves, an inductive winding in the plate circuit of each of the valves, and carrying the plate current thereof, a separate core for each of the said windings, each winding being connected in the plate circuit of the corresponding valve and carrying the plate current, a supply circuit carrying the heating current, a winding in the said supply circuit on each of the said cores, each of the first-mentioned windings being adapted to vary the magnetization of the corresponding core in senses opposite to each other, an auxiliary winding on one of the said cores wound in a direction opposite to that of the corresponding plate-circuit winding, and a direct current magnetization source for the said auxiliary winding, whereby the effects of the two windings on the core neutralize each other and permit increase of the reactance of the corresponding supply circuit winding.

In testimony whereof I have signed my name to this specification.

POPKO REINDER DIJKSTERHUIS.